(12) United States Patent
Ivanova (10) Patent No.: US 7,603,378 B2
(45) Date of Patent: Oct. 13, 2009

(54) SYSTEM AND METHOD FOR COMMON OBJECT/RELATIONAL MAPPING

(75) Inventor: Viktoriya Ivanova, Sofia (BG)

(73) Assignee: SAP (AG), Walldorf (DE)

(*) Notice: Subject to any disclaimer, the term of this patent is extended or adjusted under 35 U.S.C. 154(b) by 398 days.

(21) Appl. No.: 11/024,157

(22) Filed: Dec. 27, 2004

(65) Prior Publication Data

US 2006/0143223 A1      Jun. 29, 2006

(51) Int. Cl.
  *G06F 17/30*      (2006.01)
(52) U.S. Cl. .................................. 707/103; 717/116
(58) Field of Classification Search ............. 707/1
  See application file for complete search history.

(56) References Cited

U.S. PATENT DOCUMENTS 6,591,272 B1 *  7/2003  Williams .............. 707/102

2002/0104071 A1 *  8/2002  Charisius et al. ........... 717/109
2005/0050551 A1 *  3/2005  Sparago et al. ............. 719/320

* cited by examiner

*Primary Examiner*—Hosain T Alam
*Assistant Examiner*—Johnese Johnson
(74) *Attorney, Agent, or Firm*—Blakely, Sokoloff, Taylor & Zafman, LLP (57) ABSTRACT

A system and method for a common Object/Relational (O/R) mapping metadata file for an Enterprise Java Bean (EJB) entity bean and a Java Data Object (JDO) persistent class. In an embodiment, O/R mapping logic receives a deployment descriptor file specifying a persistent field of a persistent object. The descriptor file is at least one of an entity bean descriptor file and a JDO persistent class descriptor file. The O/R mapping logic maps the persistent field of the persistent object to a database schema based, at least in part, on the common O/R mapping metadata file.

13 Claims, 9 Drawing Sheets

Legend

? Optional element
* Multiple usage of this element is possible
+ Contains sub-elements
⬭ DTD element attribute
▭ DTD element

SYSTEM AND METHOD FOR COMMON OBJECT/RELATIONAL MAPPING

TECHNICAL FIELD

Embodiments of the invention generally relate to the field of data processing and, more particularly, to a system and method for common object/relational mapping descriptors.

BACKGROUND

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

Figure 1:
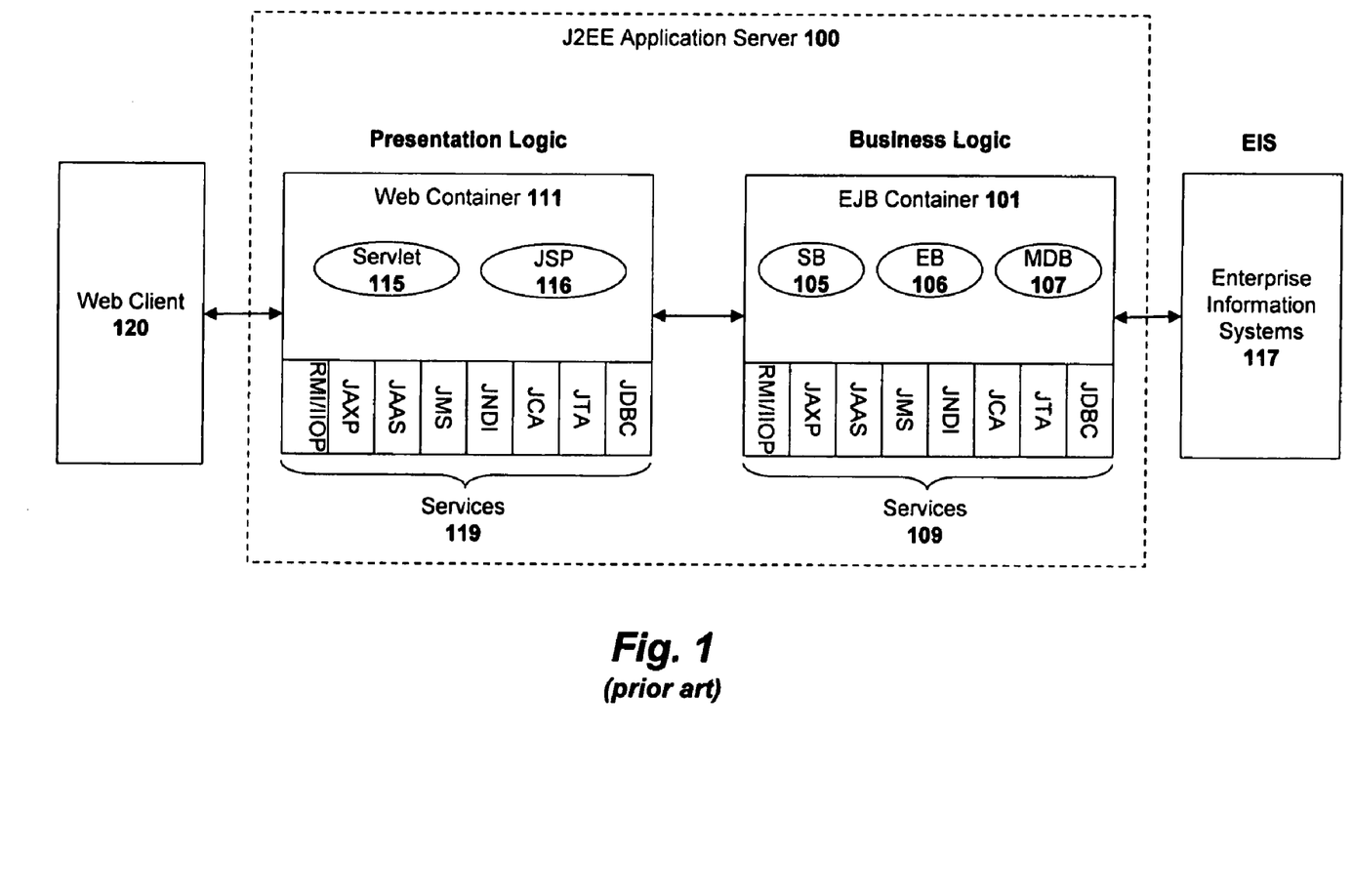
FIG. 1 is a block diagram illustrating several layers within a prior art J2EE architecture.

FIG. 1 illustrates an exemplary J2EE application server 100 in which the presentation layer is implemented as a Web container 111 and the business layer is implemented as an Enterprise JavaBeans ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1, each layer of the J2EE architecture includes multiple containers. Web container 111, for example, is itself comprised of a servlet container 115 for processing servlets and a Java Server Pages ("JSP") container 116 for processing Java server pages. EJB container 101 includes three different containers for supporting three different types of enterprise Java beans: a session bean container 105 for session beans, an entity bean container 106 for entity beans, and a message driven bean container 107 for message driven beans. The EJB specification defines, among other things, aspects of the three types of enterprise Java beans. The EJB specification refers to any of the EJB specifications including, for example, the specification entitled, "Enterprise JavaBeans™ Specification Version 2.1," (Nov. 12, 2003). A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

The information systems of a modern day enterprise (such as a corporation or government institution) are often responsible for managing and performing automated tasks upon large amounts of data. Persistent data is that data that "exists" for extended periods of time (i.e., it "persists"). Persistent data is typically stored in a database so that it can be accessed as needed over the course of its existence. Here, complex database software (e.g., such as DB2, Oracle, and SQL Server) is often used to read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction."

Figure 2:
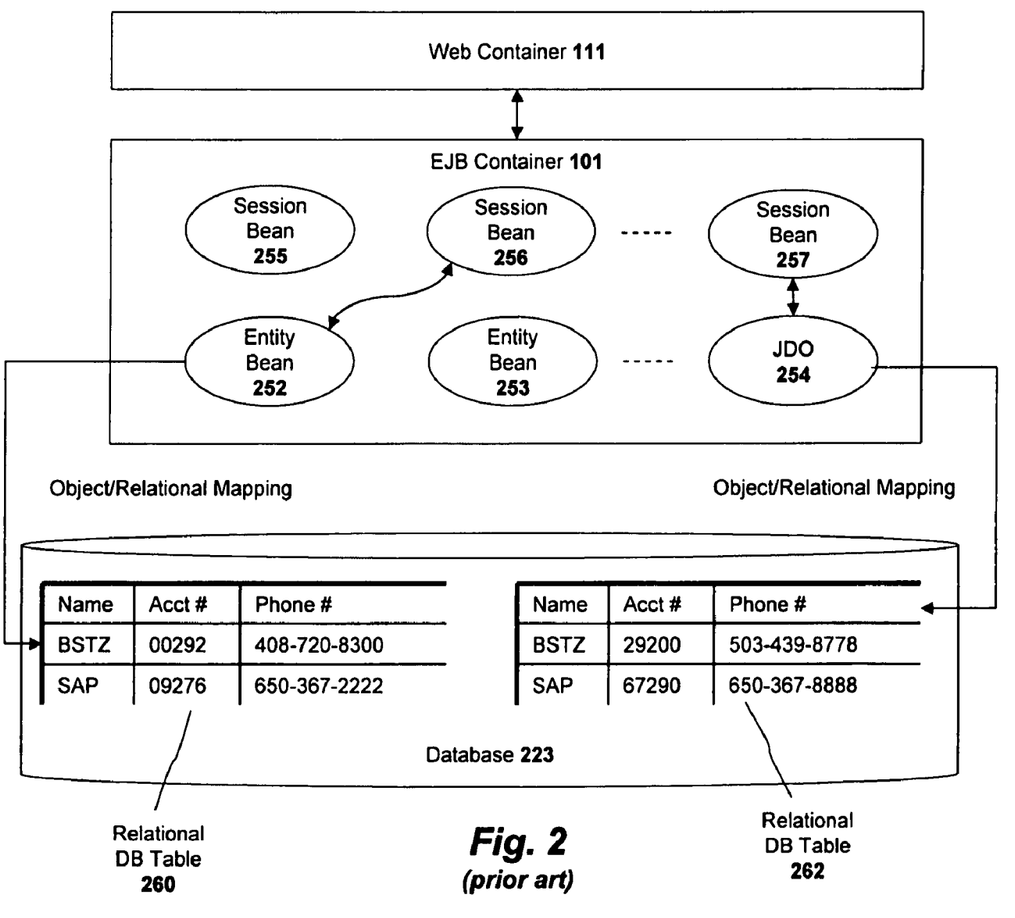
FIG. 2 is a block diagram illustrating the conventional approach of using separate Object/Relational (O/R) mapping for an entity bean and a Java Data Object.

FIG. 2 illustrates the manner in which persistent data is managed in current J2EE environments. Session beans 255-257 comprise the high level workflow and business rules implemented by application server 100. For example, in a customer relationship management ("CRM") system, session beans define the business operations to be performed on the underlying customer data (e.g., calculate average customer invoice dollars, plot the number of customers over a given timeframe, . . . etc.).

Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc.) stored within a database 223. Typically, an entity bean 252 (or 253) is mapped to a table 260 in the relational database and, as indicated in FIG. 2, each "instance" of the entity bean is typically mapped to a row in the table (referred to generally as an "object/relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands and/or Java Data Objects model). By contrast, with container-managed persistence, the EJB container 101 manages the underlying calls to the database.

The Java Data Objects (JDOs) specification defines a persistence mechanism in which the Java language is used to persist and retrieve data. The JDO specification refers to any of the JDO specifications including, for example, Java Specification Request (JSR)-000012 entitled, "Java Data Objects." A JDO persistence capable class (or, for ease of reference, a JDO) is an object that can be stored in and retrieved from a persistent data store (e.g., database 223). More specifically, a JDO is a class that implements the javax.jdo.PersistenceCapable interface. Java Data Object (JDO) 254 represents data stored in database 223. Typically, a JDO (e.g., JDO 254) is mapped to a database table (e.g., table 262) and each field of the JDO is mapped to a column of the database.

The term O/R mapping metadata refers to metadata that defines a mapping between an object and a relational database. The O/R mapping metadata for each application is declaratively described and is typically stored in an eXtensible Markup Language (XML) file. These files are commonly called O/R mapping metadata files. The structure of O/R mapping metadata files is not specified by either the EJB specification or the JDO specification. In conventional systems, Container-Managed Persistence (CMP) entity beans and JDOs have separate O/R mapping metadata files. Thus, in conventional systems, an O/R mapping metadata file can map either an entity bean or a JDO to a database, but not both.

SUMMARY OF THE INVENTION

Embodiments of the invention are generally directed to a system and method for a common Object/Relational (O/R) mapping metadata file for an Enterprise Java Bean abstract schema (e.g., comprising Container-Managed Persistence entity beans) and a Java Data Object model (e.g., comprising persistent capable objects). In an embodiment, O/R mapping logic receives a deployment descriptor file specifying a persistent field of a persistent object. The descriptor file is at least one of an entity bean descriptor file and a JDO persistent class descriptor file. The O/R mapping logic maps the persistent field of the persistent object to a database schema based, at least in part, on the common O/R mapping metadata file.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a common Object/Relational (O/R) mapping metadata file for an Enterprise Java Bean (EJB) abstract schema and a Java Data Object (JDO) model. In an embodiment, O/R mapping logic receives a deployment descriptor file specifying a mapping between object and database models. The O/R mapping logic maps the persistent field to a database schema element. In an embodiment, the use of a common XML format for EJB and JDO O/R mapping metadata allows a common set of tools (e.g., common graphical user interface tools) to be used to process the O/R mapping metadata. In addition, the use of a common XML format for EJB and JDO O/R mapping metadata allows for common O/R mapping data processing such as a common O/R mapping Application Program Interface (API). The use of a common XML format for EJB and JDO O/R mapping metadata also increases the efficiency of development by providing a common description for CMP and JDO in the O/R mapping metadata file.

Figure 3:
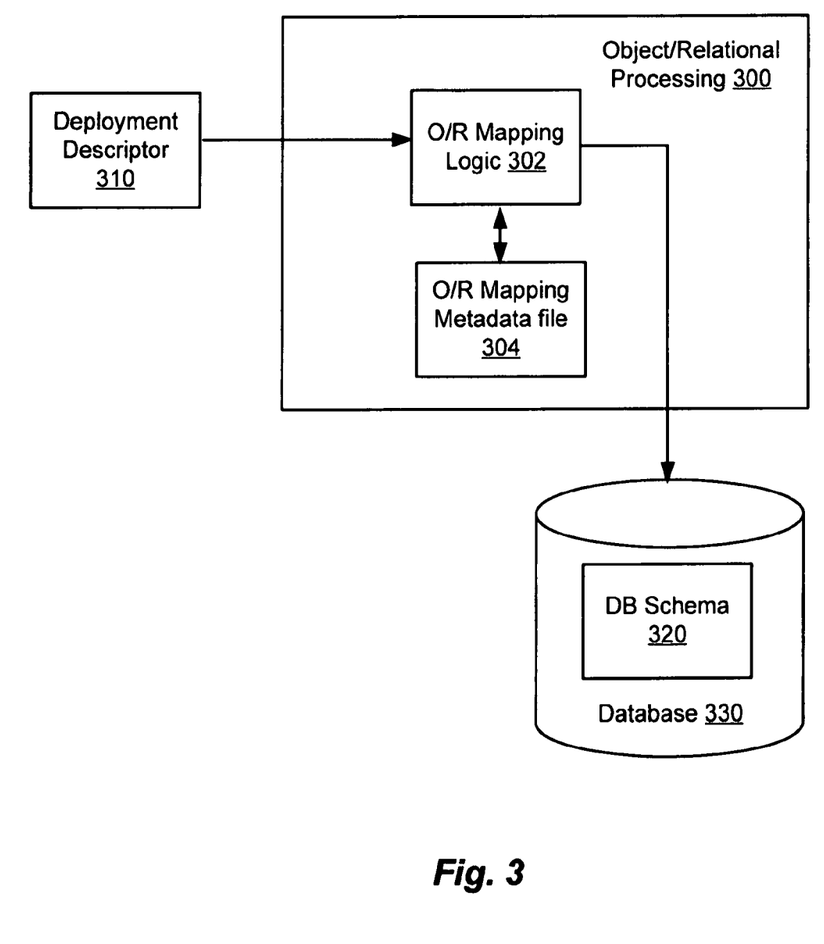
FIG. 3 is a block diagram illustrating selected elements of an O/R processing module, according to an embodiment of the invention.

FIG. 3 is a block diagram illustrating selected elements of O/R processing module 300, according to an embodiment of the invention. O/R processing module 300 includes O/R mapping logic 302 and common O/R mapping metadata file 304. As indicated in FIG. 3, O/R mapping logic 302 receives deployment descriptor file 310. A "deployment descriptor file" defines metadata for the component or application with which it is associated. In one embodiment, deployment descriptor file 310 defines, at least in part, the deployment of an entity bean or a JDO onto an application server (e.g., application server 100, shown in FIG. 1). For each entity bean or JDO, the deployment descriptor defines "persistent fields" which represent and store a single unit of data, and "relationship" fields which represent and store references to other persistent data. The deployment descriptor also includes O/R mapping metadata. In one embodiment, deployment descriptor file 310 is an XML file. Embodiments of the invention, however, are not limited to any particular file type.

O/R mapping logic 302 maps one or more elements of deployment descriptor 310 to database schema 320 based, at least in part, on common O/R mapping metadata file 304. As is further described below, in an embodiment, common O/R mapping metadata file 304 provides a mapping for both an entity bean (or entity beans) and a JDO (or JDOs) to database schema 320. Database schema 320 provides metadata defining the structure of (and constraints on) one or more tables of database 330. In one embodiment, database schema 320 is an XML file. In an alternative embodiment, database schema 320 is structured according to the syntax and semantics of a different language (e.g., a different markup language). In an embodiment, O/R mapping metadata file 304 is part of deployment descriptors 310. O/R mapping logic 302 maps persistent fields (at the object layer) of CMP or JDO to a database element specified by O/R mapping metadata file 304.

In an embodiment, O/R processing module 300 may be part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG.

Figure 4:
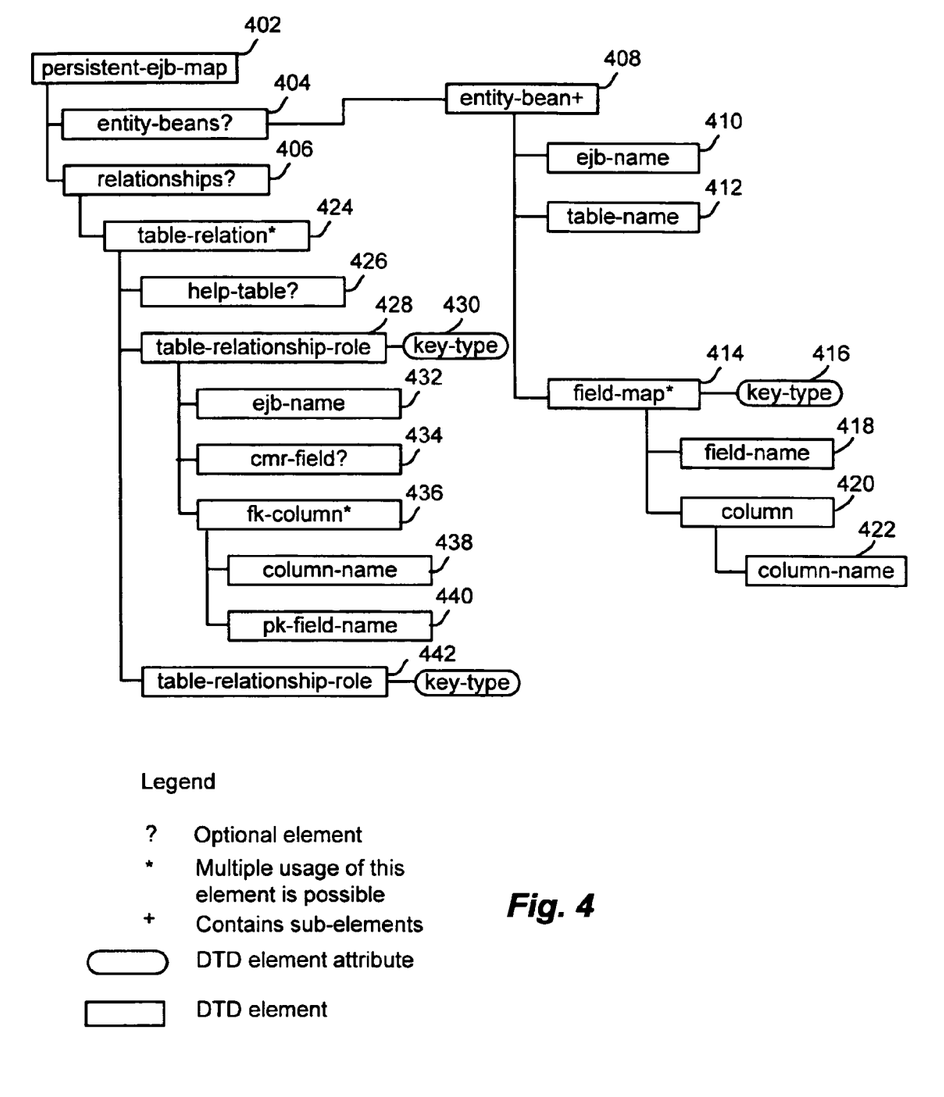
FIG. 4 is a block diagram illustrating an example of O/R mapping metadata (Data Type Definition (DTD) used by the metadata XML) for a CMP entity bean abstract schema.

FIG. 4 is a block diagram illustrating mapping metadata for a CMP abstract schema (typically comprising many CMP entity beans, e.g., entity bean 252, shown in FIG. 2). Persistent-ejb-map element 402 is the root element and it contains information about the persistent fields of one or more entity beans and relationships among the entity beans. For example, entity-beans element 404 contains a list of the entity beans to which the metadata applies and relationship element 406 describes the relationships between the entity beans in the database tables.

Entity-bean element 408 specifies a mapping between an entity bean and a particular database table. EJB-name element 410 provides the name of the entity bean (e.g., as defined in the ejb-jar.xml of the entity bean) and table-name element 412 provides the name of the database table to which the entity bean is mapped. The entity bean described by entity-bean element 408 typically includes one or more fields of data to be persisted on the database table. Typically, each of the one or more fields is mapped to a particular column of the database table. Field-map element 414 defines the mapping between the fields of the entity bean and the columns of the table that is identified by element 412.

Relational databases typically include columns having different column types. In one embodiment, the column that stores a value for a cmp-field (e.g., non-relationship field) may be of types: primary key, no key, or unique key. A primary key type column refers to a column that contains the primary key for the database table. A no key type column, as the name implies, refers to a column that does not contain a key for the database table. The unique key type column refers to a column that contains a unique key for the database table. In an embodiment, key-type element 416 specifies a column type for the columns referenced in field-map element 414. Field-name element 418 specifies a field of the entity bean and column element 420 contains metadata for the column to which the field is mapped (e.g., a column name as provided by column-name element 422).

Relationships element 406 specifies relationships between entity beans. A relationship between entity beans is characterized by its multiplicity (e.g., 1:1, 1:M, M:N). A relationship is "one-to-one" if each entity bean is associated with a single instance of another entity bean and "one-to-many" if each entity bean is associated with many instances of another entity bean. A relationship is "many-to-many" if entity bean instances may be related to multiple instances of each other.

Table-relation element 424 defines a relationship between two entity beans using references between primary key column(s) and foreign key column(s), or logical foreign key column(s). A column is called "a logical foreign key" if it is a column that contains the values of the referenced table's primary key column, but is not declared as a foreign key. As used herein, the term "foreign key" refers to both a standard foreign key and a logical foreign key.

Help-table element 426 provides the name of a join table which is used in the case of an M:N relationship. In many-to-many bidirectional relationships, there are corresponding fields of set type on both sides of the relationship. In the relational model there is typically a database table that contains foreign keys to one table of both sides of the many-to-many bidirectional relationship. The term "join table" refers the database table that contains these foreign keys. The terms bidirectional relationship and unidirectional relationship refer to the object representation of a relationship. Typically relationships with multiplicity 1:1, 1:M, or M:1 are represented in the database by pair(s) (primary key column, foreign key column). In the case of a compound primary key (e.g., a primary key consisting of many columns) many pairs are used. Primary key columns are part of the "one side of the relationship" bean's table while foreign key columns are part of the "other side of the relationship" bean's table and they refer to the primary key columns. In the case of a M:M relationship a join table is used. Some of the join table columns are foreign key columns that refer to the primary key columns of the "one side of the relationship" bean's table. The remaining columns of the join table are foreign key columns that refer to the primary key columns of the "other side of the relationship" bean's table.

Table-relationship-role element 428 specifies a role in the database (primary key or foreign key side) for the relationship using key-type element 430. Each relationship has two sides. Each of the two sides is described by a table-relationship-role element. The table relationship role refers to which side of the relationship (e.g., either referencing or referenced) element 428 is directed. For example, if key-type element 430 specifies "primary key," then element 428 is directed to the referenced side of the relationship. Alternatively, if key-type element 430 specifies either "no key" or "foreign key," then element 430 is directed to the referencing side of the relationship. In either case, ejb-name element 432 and cmr-field 434, respectively, provide the name of the entity bean and field that is ether referencing or referenced by the relationship. If element 428 is directed to the referencing side of the relationship, Fk-column-name element 436 specifies a foreign key column and its reference to a corresponding primary key field. For example, column-name element 438 provides the name of the foreign key column and Pk-field-name element 440 provides the name of the referenced primary key field. Table-relationship-role element 442 defines the opposing role to the role defined by element 428. That is, if element 428 specifies the "referencing side" of relationships, then element 442 specifies the "referenced" side of one or more relationships. At the object layer the ejb-name and cmr-field uniquely identify the described relationship. Thus, ejb-name field element 432 and cmr-field element 434 are used to specify the relationship.

Figure 5:
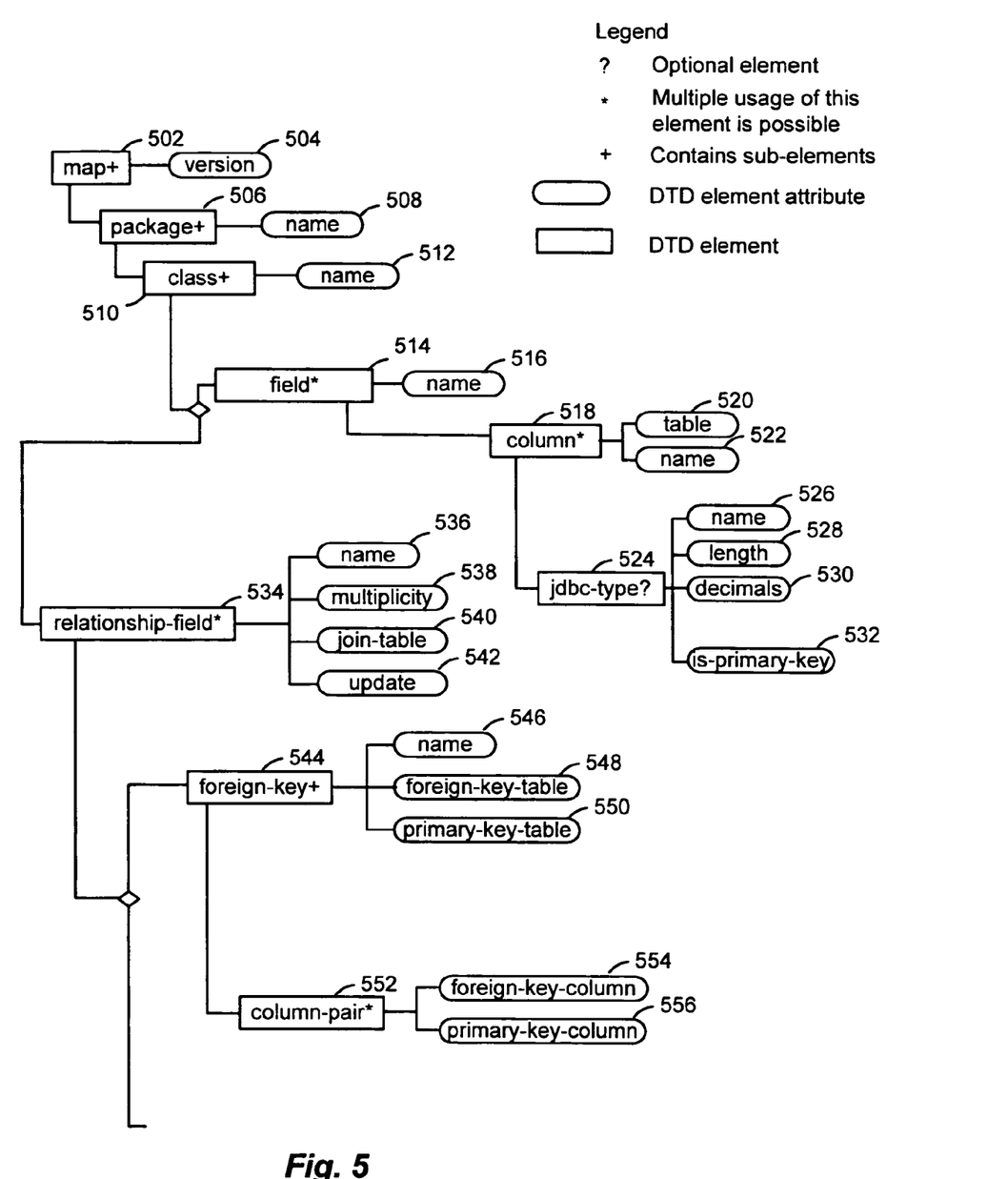
FIG. 5 is a block diagram illustrating an example of O/R mapping metadata (DTD used by the metadata XML) for a Java Data Object model.

FIG. 5 is a block diagram illustrating mapping metadata for a JDO (e.g., JDO 254, shown in FIG. 2). In general terms, the relation to the JDO object model is facilitated through the class and field elements. The relation to the database schema is facilitated through the column and foreign key elements. Map element 502 is the root element and includes version attribute 504 to specify the version of the mapping metadata. Package element 506 includes all classes of a particular package that is identified by name attribute 508.

Class element 510 includes the relationship and non-relationship fields of the class identified by name attribute 512. Class element 510 includes a field element 514 for each persistent non-relationship field of the class. Name attribute 516 is the field name as defined in the class. Field element 514 includes metadata specifying the column to which a corresponding field is mapped. For example, column element 518 contains a description of a column to which field element 514 is mapped. Column element 518 includes, for example, table attribute 520 and name attribute 522. Name attribute 522 provides the name for the column. Table attribute 520 specifies the table to which the column belongs.

JDBC type element 524 describes the JDBC type of column 518. The JDBC type is identified by the following attributes: name 526, length 528, and decimals 530. In an embodiment, JDBC type element 524 is optional and is typically used when no catalog information is available for the column. JDBC type element 524 also includes is-primary-key attribute 532. In an embodiment, is-primary-key attribute 532 specifies whether column 518 contains a primary key of the table.

Class element 510 includes a relationship-field element 534 for each persistent relationship field of the class. Relationship-field element 534 contains, for example, the foreign keys and generic persistent references for the relationship. Field name attribute 536 contains the name of the persistent relationship field as defined by the class. Multiplicity attribute 538 is "one" or "many," depending on the relationship type (e.g., 1:1, 1:M, M:M, etc.). Join-table attribute 540 specifies whether a join table is used (e.g., with a true/false value). Update attribute 542 specifies whether the value of this relationship field is used for updating the database. Update attribute 542 is relevant for many-to-many and one-to-one bidirectional relationships. In such cases, one of the sides of the relationship is declared as non-updatable.

Foreign-key element 544 describes a foreign key in the database. Name attribute 546 provides the name of the foreign key. Foreign-key-table attribute 548 and primary-key-table attribute 550, respectively, specify the foreign key and primary key tables in the database. Column-pair element 552 contains one or more column pairs (e.g., attributes 554-556) corresponding to the columns in the foreign key and primary key tables specified in foreign-key element 544.

Figure 6:
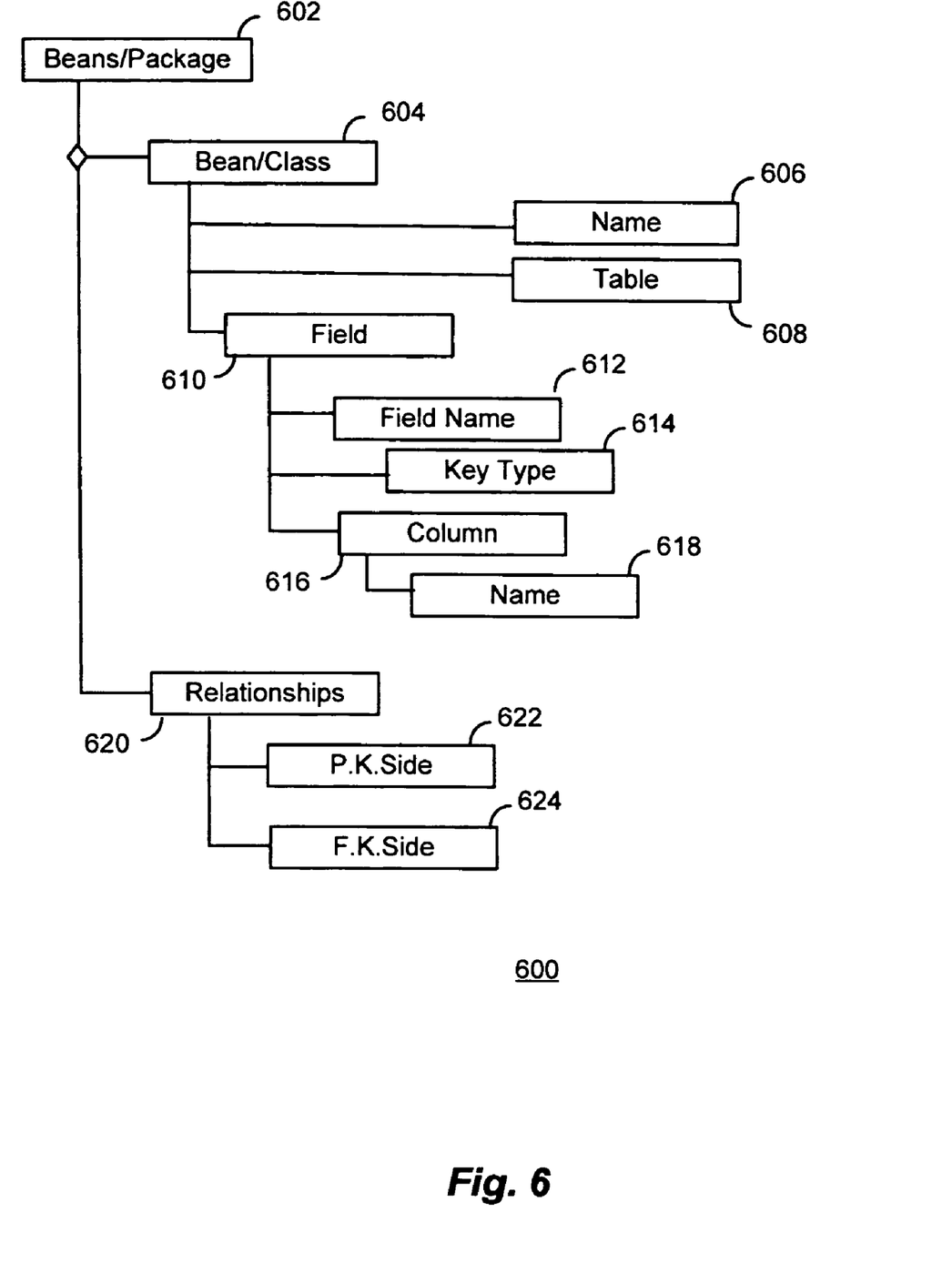
FIG. 6 is a block diagram of selected elements of a common O/R mapping metadata file, according to an embodiment of the invention.

FIG. 6 is a block diagram of selected elements of common O/R mapping metadata file 600, according to an embodiment of the invention. Common O/R mapping metadata file 600 includes mapping metadata for one or more EJB entity beans and one or more JDO persistent classes. For example, file 600 provides a mapping of the persistent data of an entity bean to a database schema and a mapping of the persistent fields of a JDO to the database schema. In one embodiment, some or all of the information discussed above, with reference to FIGS. 4 and 5, is contained in common O/R mapping metadata file 600.

In an embodiment, root element 602 includes the description of one or more entity beans and one or more JDOs. In the illustrated embodiment, root element 602 includes Bean/Class element 604 and relationships element 620. The primary difference between the description of a relationship in EJB and JDO O/R mapping descriptors is that in EJB O/R mapping a relationship is part of the schema model while, in JDO O/R relational mapping, each side of the relationship is part of the corresponding related JDOs. In an embodiment, relationship element 620 may use one or both of these approaches to describe a relationship. In an alternative embodiment, root element 602 may include more elements, fewer elements, and/or different elements. In addition, each element shown in FIG. 6 may include one or more sub-elements and/or one or more attributes.

Bean/Class element 604 contains all persistent non-relationship information for either the entity bean or the JDO that is identified by name element 606. Name element 606 may be either the name of the entity bean or the class name of the JDO. Table element 608 specifies the table to which the entity bean or JDO is mapped.

Entity Bean/Class element 604 contains one or more field elements 610. Each field element 610 describes the mapping for a persistent field. In an embodiment, there is a field element 610 to describe the mapping for each non-relationship persistent field. The fields may be, for example, either the Container Managed Persistence (CMP) fields of an EJB or the non-relationship fields of a JDO. Field name element 612 specifies the name of the field. Field name element 612 may be the name of a CMP field or the name of a field as defined by a JDO class.

Key type element 614 specifies a key type for the field. For example, if the field named by element 612 is mapped in the database to a column that is a primary key, then corresponding key type element 614 specifies a key type of "primary key." Column element 616 specifies a database column to which the field is mapped. In an embodiment, each CMP field is typically mapped to a particular column. Similarly, in an embodiment, each JDO field is typically mapped to a particular column. Name attribute 618 specifies the name of the column.

In an embodiment, relationships element 620 contains metadata specifying the relationships either between entity beans or between JDOs. For example, if Bean/Class element 604 specifies an entity bean, then relationships element 620 specifies the relationships between that entity bean and one or more other entity beans. Similarly, if Bean/Class element 604 specifies a JDO, then relationships element 620 specifies the relationships between that JDO and one or more other JDOs.

In one embodiment, relationships element 620 includes a description of many relationship elements. Each relationship is characterized by a primary key side described by element 622 and the referenced foreign key side described by element 624. In an embodiment, relationships with multiplicity M:M are described by two primary key-foreign key pairs (while relationships with multiplicity 1:1, 1:M or M:1 are described by only one pair) because of join-table usage.

Figure 7:
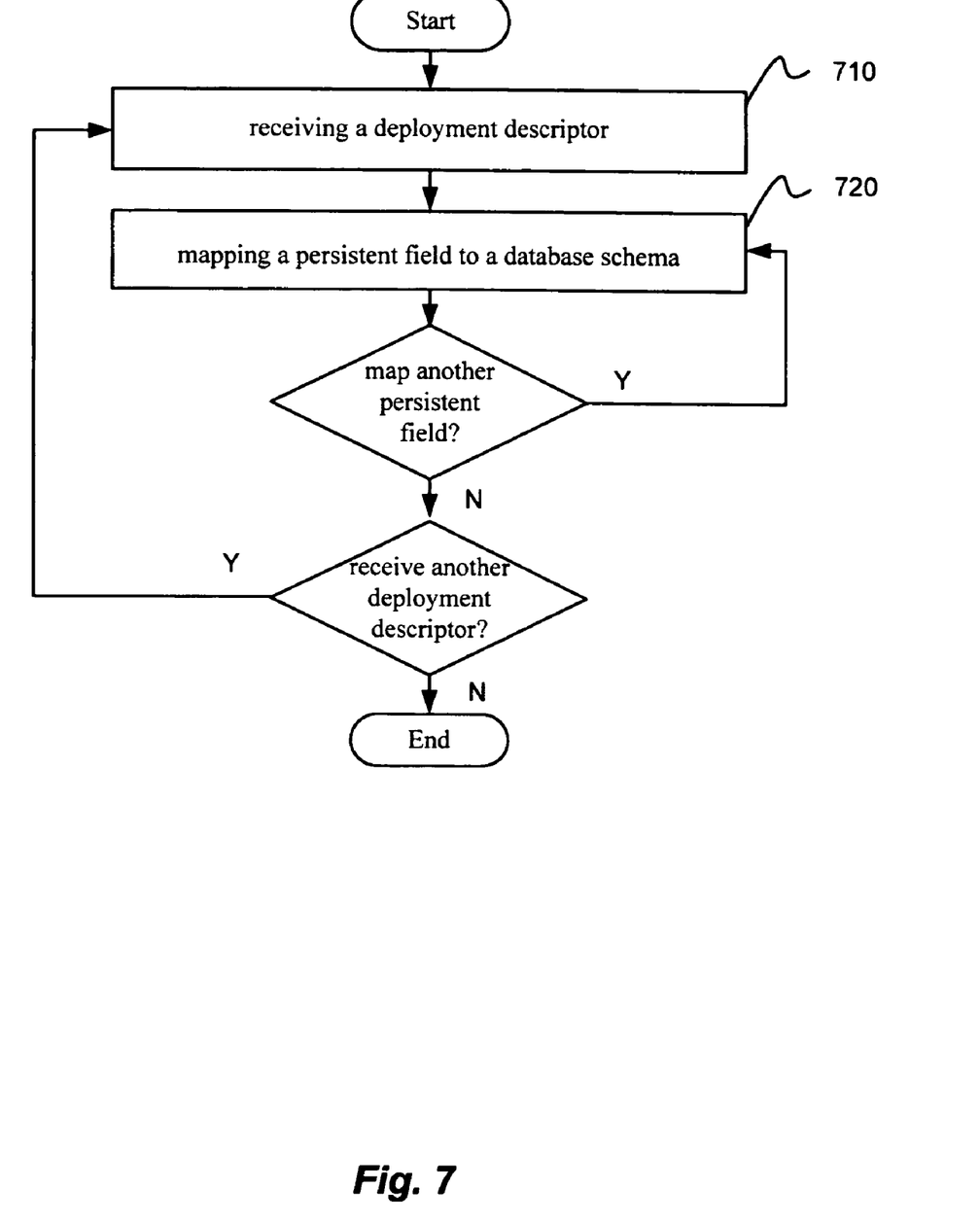
FIG. 7 is a flow diagram illustrating certain aspects of a method for using a common O/R mapping metadata file, according to an embodiment of the invention.
Figure 8:
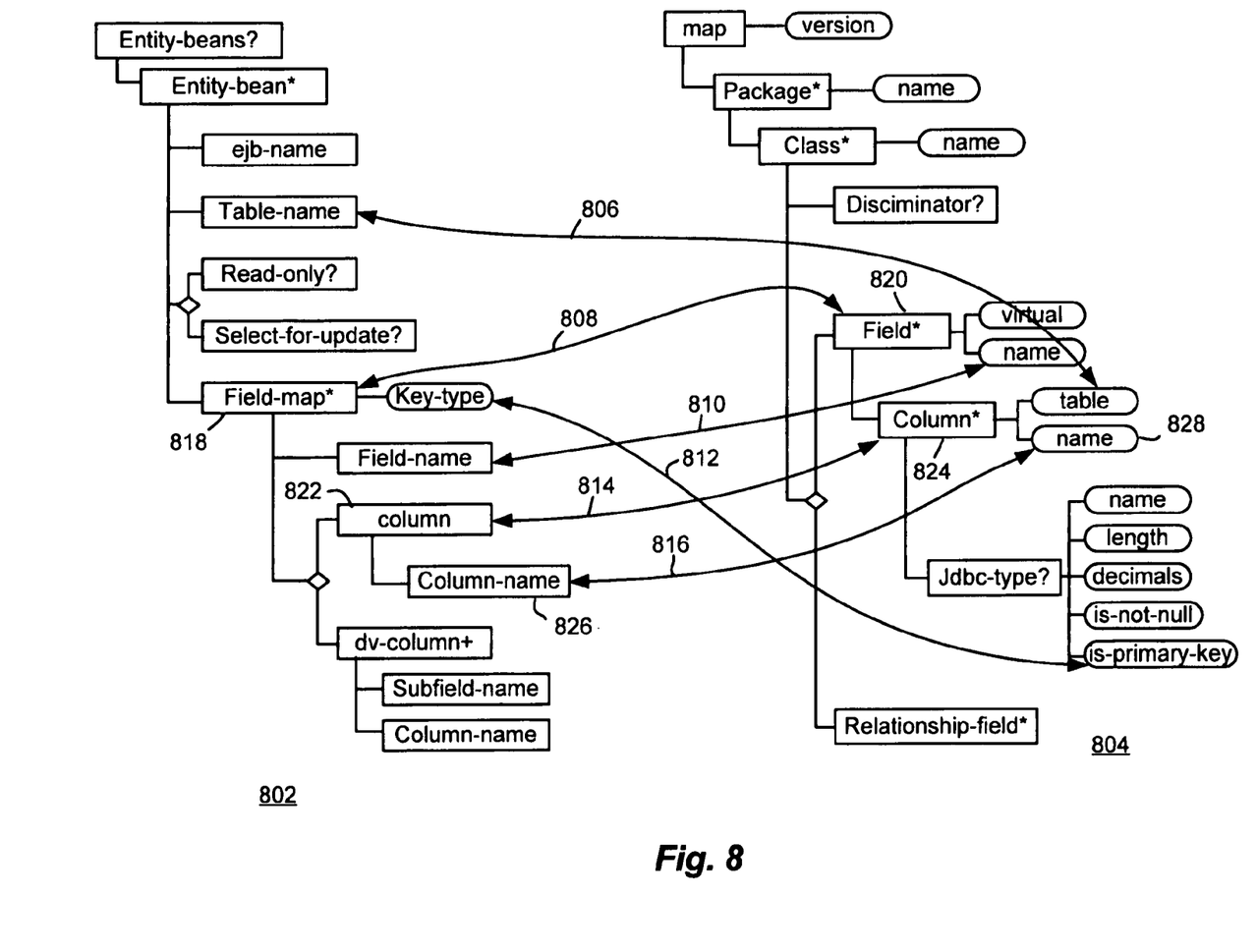
FIG. 8 is a conceptual illustration of the common mapping of non-relationship information between entity bean mapping metadata and JDO mapping metadata, according to an embodiment of the invention.
Figure 9:
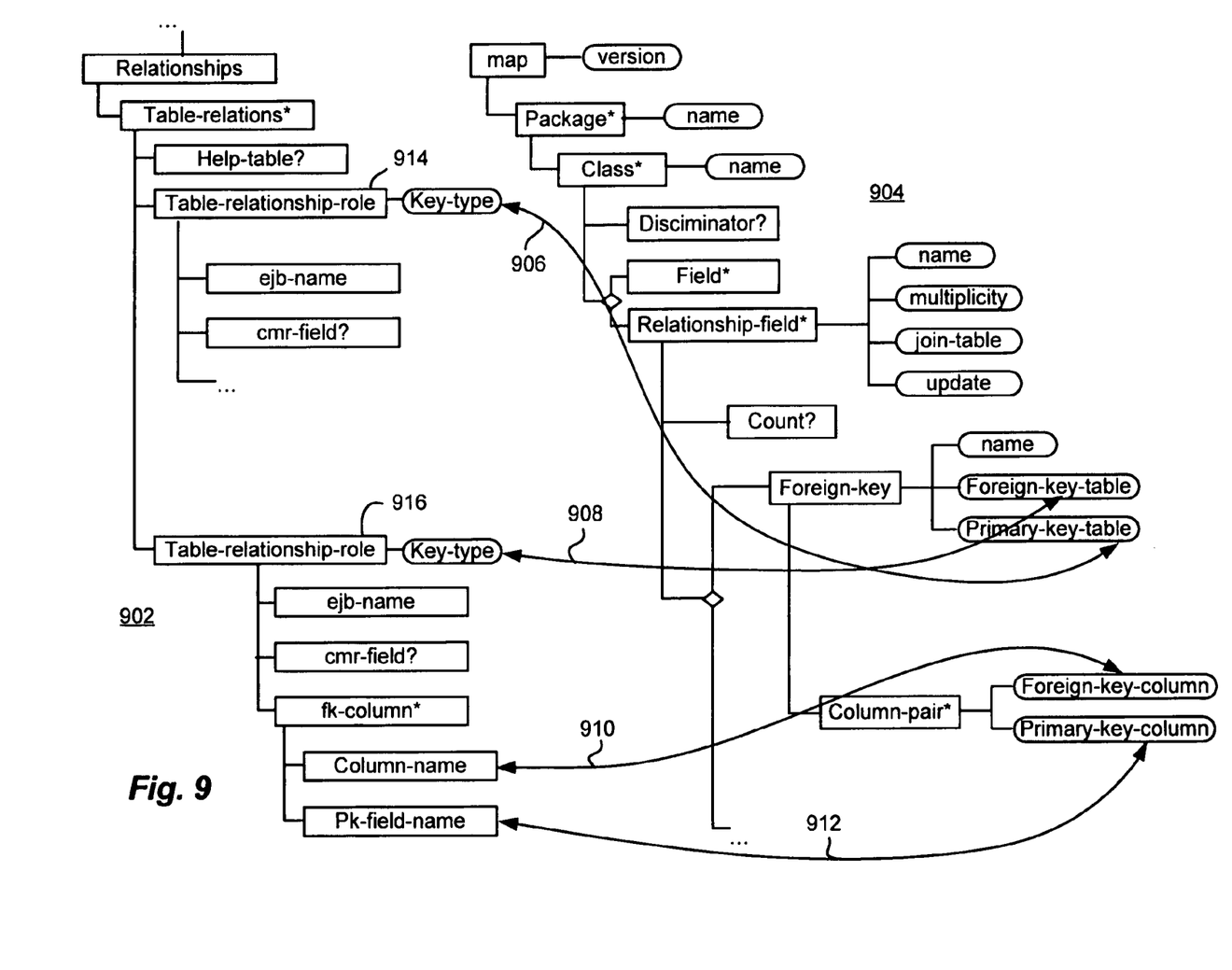
FIG. 9 is a conceptual illustration of the common mapping of relationship information between entity bean mapping metadata and JDO mapping metadata, according to an embodiment of the invention.

Turning now to FIGS. 7-9, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for using a common O/R mapping metadata file, according to an embodiment of the invention. Referring to process block 710, O/R processing logic (e.g., O/R processing logic 302, shown in FIG. 3) receives a deployment descriptor (e.g., deployment descriptor 310, shown in FIG. 3). The deployment descriptor is either an EJB entity bean deployment descriptor or a JDO persistent class deployment descriptor. In one embodiment, the deployment descriptor is an XML file.

The received deployment descriptor may be parsed to obtain one or more persistent fields of the entity bean or the JDO. The persistent field may be a relationship persistent field or a non-relationship persistent field. For example, the persistent field may be a CMR field of an entity bean or a relationship field of a JDO. Similarly, the persistent field may be either a CMP field of the entity bean or a non-relationship of the JDO.

In an embodiment, the received deployment descriptor includes a common O/R mapping metadata file (e.g., common O/R mapping metadata file 304, shown in FIG. 3). In one embodiment, the O/R processing logic creates an object structure (e.g., a descriptors tree) that is used by common tools (e.g., a common graphical user interface or an implementation of a common O/R mapping API) and may also be used in further aspects of the deployment process. Referring to process block 720, the O/R processing logic maps the persistent field to a database schema based, at least in part, on a common O/R mapping metadata file. Mapping the persistent field to the database schema includes mapping a non-relationship field (e.g., a CMP field of an entity bean) to a particular column or columns of a database table or tables. Mapping the persistent field also includes mapping a relationship field (e.g., a JDO relationship field) to, for example, pair(s) (primary key, foreign key) of the referenced tables in the database.

FIG. 8 is a conceptual illustration of the common mapping of non-relationship information between entity bean mapping metadata 802 and JDO mapping metadata 804. As illustrated in FIG. 8, it is possible to provide a common mapping because mapping metadata 802 and mapping metadata 804 contain substantially similar non-relationship mapping metadata. For example, indicator 806 shows that mapping metadata 802 and 804 each include an element to specify a table to which an entity or JDO is mapped.

Indicator 808 shows that mapping metadata 802 and 804 each include one or more elements to specify a mapping between a field and a column. For example, field element 818 specifies an entity bean field and field element 820 specifies a JDO field (as shown by 810). Column elements 822 and 824 respectively specify the columns to which the fields are mapped (as shown by 814). The names of the columns are respectively specified by elements 826 and 828 (as shown by 816). In addition, mapping metadata 802 and 804 each specify a column type for the column (e.g., whether the column contains a primary key) as shown by 812.

In one embodiment, a common O/R mapping metadata file (e.g., common O/R mapping metadata file 600, shown in FIG. 6) provides the common mapping metadata shown in FIG. 8 to facilitate mapping the non-relationship elements of either an entity bean or a JDO to a database schema. In alternative embodiments, the common O/R mapping metadata file may include more common elements, fewer common elements, and/or different common elements than those shown in FIG. 8.

FIG. 9 is a conceptual illustration of the common mapping of relationship information between entity bean mapping metadata 902 and JDO mapping metadata 904. As illustrated in FIG. 9, it is possible to provide a common mapping because mapping metadata 902 and mapping metadata 904 contain substantially similar relationship mapping metadata. For example, indicator 906 shows that mapping metadata 902 and 904 each include an element (or elements) to describe a primary key or foreign key relationship role. For example, mapping metadata 902 contains table-relationship-role element 914 to specify a first relationship role (e.g., the referenced side) and table-relationship-role element 916 to specify the opposing relationship role (e.g., the referencing side) as shown by 908. In addition, each of mapping metadata 902 and 904 contain information about the foreign key—primary key column pairs of the foreign key and primary key tables of the database (as shown by indicators 910-912).

In one embodiment, a common O/R mapping metadata file (e.g., common O/R mapping metadata file 600, shown in FIG. 6) provides the common metadata shown in FIG. 9 to facilitate mapping the relationship elements of either an entity bean or a JDO to a database schema. In alternative embodiments, the common O/R mapping metadata file may include more common elements, fewer common elements, and/or different common elements than those shown in FIG. 9.

Referring again to FIG. 7, mapping the persistent field to the database schema includes mapping a non-relationship field (e.g., a CMP field of an entity bean) to a particular column of a database table. For example, the O/R mapping logic may identify a name of the database table to which the field is mapped from a table element (e.g., table element 608, shown in FIG. 6). Similarly, the O/R mapping logic may identify a column to which the persistent field is mapped from a column element (e.g., column element 616, shown in FIG. 6). In an embodiment, the O/R mapping logic identifies a column type of the column from, for example, a key type element (e.g., key type element 614, shown in FIG. 6). Identifying the column type includes reading an element (and/or attribute) to determine whether the column is a primary key column.

In an embodiment, mapping the persistent field includes mapping a relationship field (e.g., a JDO relationship field) to the database schema. For example, the O/R mapping logic may identify a relationship from a relationship element (e.g., relationship element 620, shown in FIG. 6). The O/R mapping logic may identify whether the relationship is a primary key role (e.g., on the referenced side) or a foreign key role (e.g., on the referencing side) from, for example, a primary key side element (e.g., element 622, shown in FIG. 6) and a foreign key side element (e.g., element 624, shown in FIG. 6). In an alternative embodiment, more elements, fewer elements, and/ or different elements of a common O/R metadata file may be accessed to provide common O/R mapping for an entity bean and a JDO.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a remote computer (e.g., a server) to a requesting computer (e.g., a client).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
   receiving, at an Object/Relational (O/R) processing module included in an application server, a deployment descriptor file defining the deployment of a persistent object onto the application server, the persistent object and the deployment descriptor file consistent with at least one of
   an Enterprise Java Bean (EJB) entity bean specification, and
   a Java Data Object (JDO) persistent class specification, wherein the deployment descriptor file defines the deployment of the persistent object onto the application server;
   parsing the received deployment descriptor to obtain a persistent field of the persistent object; and
   updating a database based on the persistent field, the database coupled to the application server via business logic, wherein updating includes
   mapping the persistent field to a schema of the database based, at least in part, on a single O/R mapping metadata file that provides a mapping for the persistent field, to the database, wherein the single O/R mapping metadata file includes
   a first set of metadata for mapping persistent objects consistent with the EJB specification, wherein the first set of metadata indicates the business logic, and a second set of metadata for mapping persistent objects consistent with the JDO specification.

2. The method of claim 1, wherein mapping the persistent field to a schema of the database based, at least in part, on a single O/R mapping metadata file comprises:
identifying a name of a database table to which the persistent field is mapped.

3. The method of claim 2, wherein mapping the persistent field to a schema of the database based, at least in part, on a single O/R mapping metadata file comprises:
identifying a type of column to which the persistent field is mapped.

4. The method of claim 3, wherein the type of column to which the persistent field is mapped comprises:
a primary key column.

5. The method of claim 2, wherein mapping the persistent field to a schema of the database based, at least in part, on a single O/R mapping metadata file comprises:
identifying a name of a column to which the persistent field is mapped.

6. The method of claim 2, wherein mapping the persistent field to a schema of the database based, at least in part, on a single O/R mapping metadata file comprises:
identifying a table relationship for the persistent field.

7. The method of claim 6, wherein identifying the table relationship for the persistent field comprises at least one of:
identifying a primary key relationship role; and
identifying a foreign key relationship role.

8. The method of claim 1, wherein the common O/R mapping metadata file is structured, at least in part, according to the eXtensible Markup Language (XML).

9. An article of manufacture comprising:
a computer readable storage medium providing instructions for persisting an object having one or more object members that, when executed by an apparatus, cause the apparatus to:
receive, at an Object/Relational (O/R) processing module included in an application server, a deployment descriptor file defining the deployment of a persistent object onto the application server, the persistent object and the deployment descriptor file consistent with at least one of
an Enterprise Java Bean (EJB) entity bean specification, and
a Java Data Object (JDO) persistent class specification.

wherein the deployment descriptor file defines the deployment of the persistent object onto the application server;
parse the received deployment descriptor to obtain a persistent field of the persistent object; and
update a database based on the persistent field, the database coupled to the application server via business logic, wherein updating includes
mapping the persistent field to a schema of the database based, at least in part, on a single O/R mapping metadata file that provides a mapping for the persistent field, to the database, wherein the single O/R mapping metadata file includes
a first set of metadata for mapping persistent objects consistent with the EJB specification, wherein the first set of metadata indicates the business logic, and
a second set of metadata for mapping persistent objects consistent with the JDO specification.

10. The article of manufacture of claim 9, wherein the instructions that, when executed by the apparatus, cause the apparatus to map the persistent field to a schema of the database based, at least in part, on a single O/R mapping metadata file cause the apparatus to:
identify a name of a database table to which the persistent field is mapped.

11. The article of manufacture of claim 10, wherein the instructions that, when executed by the apparatus, cause the apparatus to map the persistent field to a schema of the database based, at least in part, on a single O/R mapping metadata file cause the apparatus to:
identify a type of column to which the persistent field is mapped.

12. The article of manufacture of claim 11, wherein the instructions that, when executed by the apparatus, cause the apparatus to identify the type of column to which the persistent field is mapped cause the apparatus to:
identify the type of column to which the persistent field is mapped as a primary key column.

13. The article of manufacture of claim 10, wherein the instructions that, when executed by the apparatus, cause the apparatus to map the persistent field to a schema of the database based, at least in part, on a single O/R mapping metadata file cause the apparatus to:
identify a name of a column to which the persistent field is mapped.

* * * * *